(12) United States Patent
Fan

(10) Patent No.: US 11,550,211 B2
(45) Date of Patent: Jan. 10, 2023

(54) ILLUMINATION SYSTEM AND PROJECTION DEVICE

(71) Applicant: Coretronic Corporation, Hsin-Chu (TW)

(72) Inventor: Chen-Wei Fan, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/511,587

(22) Filed: Oct. 27, 2021

(65) Prior Publication Data

US 2022/0137495 A1   May 5, 2022

(30) Foreign Application Priority Data

Nov. 2, 2020 (CN) .......................... 202022489243.X

(51) Int. Cl.
*G03B 21/20* (2006.01)
*G02B 26/00* (2006.01)

(52) U.S. Cl.
CPC ......... *G03B 21/204* (2013.01); *G02B 26/008* (2013.01); *G03B 21/208* (2013.01); *G03B 21/2066* (2013.01)

(58) Field of Classification Search
CPC .......................... G03B 21/204; G03B 21/2066; G03B 21/208; G03B 33/08; G02B 26/008; G02B 27/0994
See application file for complete search history.

(56) References Cited

U.S. PATENT DOCUMENTS

| | | | | |
|---|---|---|---|---|
| 2016/0377785 | A1* | 12/2016 | Chestakov | F21S 43/14 362/606 |
| 2018/0024425 | A1* | 1/2018 | Fujita | G03B 21/16 362/84 |
| 2020/0064722 | A1* | 2/2020 | Suzuki | G03B 21/2066 |

FOREIGN PATENT DOCUMENTS

| | | |
|---|---|---|
| CN | 202600341 U | 12/2012 |
| TW | 585255 U | 4/2004 |

* cited by examiner

*Primary Examiner* — Magda Cruz

(57) ABSTRACT

An illumination system includes a light source, a wavelength conversion element and a light guide column. The light source provides an excitation beam. The wavelength conversion element has a wavelength conversion portion for converting the excitation beam into a converted beam. The light guide column is disposed between the light source and the wavelength conversion element and located on a transmission path of the excitation beam. The light guide column has a first end, a second end opposite to the first end, a third end and a fourth end opposite to the third end. The third and fourth ends respectively face the light source and the wavelength conversion element. The third end receives the excitation beam. The excitation beam exits the first or fourth end, and the converted beam enters the light guide column through the fourth end and exits the first end. A projection device is also provided.

18 Claims, 6 Drawing Sheets

120a

100b

ILLUMINATION SYSTEM AND PROJECTION DEVICE

CROSS-REFERENCE TO RELATED APPLICATION

This application claims the priority benefit of China application CN202022489243.X, filed on Nov. 2, 2020. The entirety of the above-mentioned patent application is hereby incorporated by reference herein and made a part of this specification.

FIELD OF THE INVENTION

The invention relates to an optical system, and more particularly to an illumination system and a projection device equipped with the illumination system.

BACKGROUND OF THE INVENTION

The illumination system of the current laser projection device generally uses blue laser diodes to provide blue light to excite the phosphor on the phosphor wheel to generate yellow light, and then filter the yellow light to generate the required red and green light through a filter wheel. The generated red and green light are matched with the blue light emitted by the blue laser diode to form the three primary colors of red, green and blue required for the projection image.

In the illumination system using blue laser diodes and phosphor wheels, a dichroic element is provided between the blue laser diode and the phosphor wheel. The blue light passes through the dichroic element and is transmitted to the phosphor wheel. The yellow light generated by the phosphor is reflected to the dichroic element, and is then reflected to the filter wheel by the dichroic element. On the other hand, the blue light that is not absorbed by the phosphor is guided by a plurality of reflectors, passes through the dichroic element, and is transmitted to the filter wheel. In addition, a light guide column is provided on the light exit side of the filter wheel to homogenize the beam passing through the filter wheel and adjust the light shape.

Because the current illumination system using blue laser diodes and phosphor wheels has many optical elements, the current illumination system not only has a larger size, but also has some problems such as difficulty in assembly and poor accuracy.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides an illuminating system, which can reduce the number of optical elements, so as to have the advantages of easy assembly, good optical path accuracy and small size.

The invention provides a projection device, which has the advantages of small size and good image quality.

Other objectives and advantages of the invention can be further illustrated by the technical features broadly embodied and described as follows.

In order to achieve one or a part or all of the above or other objectives, the invention provides an illumination system, which includes a light source, a wavelength conversion element and a light guide column. The light source is used to provide an excitation beam. The wavelength conversion element has a wavelength conversion portion used to convert the excitation beam into a converted beam. The light guide column is disposed between the light source and the wavelength conversion element and is located on a transmission path of the excitation beam. The light guide column has a first end, a second end opposite to the first end, a third end, and a fourth end opposite to the third end. The third end faces the light source. The fourth end faces the wavelength conversion element. The third end is used to receive the excitation beam. The excitation beam exits from the first end or the fourth end, and the converted beam enters the light guide column through the fourth end and exits from the first end. The invention also provides a projection device adopting the illumination system.

In order to achieve one or a part or all of the above or other objectives, the invention provides a projection device, which includes the aforementioned illumination system, a light valve and a projection lens. The illumination system is used to provide an illumination beam. The light valve is disposed on a transmission path of the illumination beam to convert the illumination beam into an image beam. The projection lens is disposed on a transmission path of the image beam.

In the illuminating system of the embodiment of the invention, the light guide column is disposed between the light source and the wavelength conversion element, the third end of the light guide column faces the light source, and the fourth end opposite to the third end faces the wavelength conversion element. The excitation beam provided by the light source can be incident on the wavelength conversion element after passing through the third end and the fourth end. A part of the excitation beam is converted into the converted beam by the wavelength conversion element, and the converted beam can be incident on the light guide column and exits the light guide column through the first end. In another aspect, another part of the excitation beam not converted by the wavelength conversion element may be incident on the light guide column again and exits the light guide column through the first end. In other words, the light guide column of the illuminating system in the embodiment of the invention also has dichroic and light homogenization functions, in addition to the light guide function. Therefore, some internal components can be omitted, thereby simplifying the overall structure and achieving the advantages of easy assembly, good optical path accuracy and small size. In addition, because the projection device of the embodiment of the invention is equipped with the aforementioned illumination system, the projection device has the advantages of small size and good image quality.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
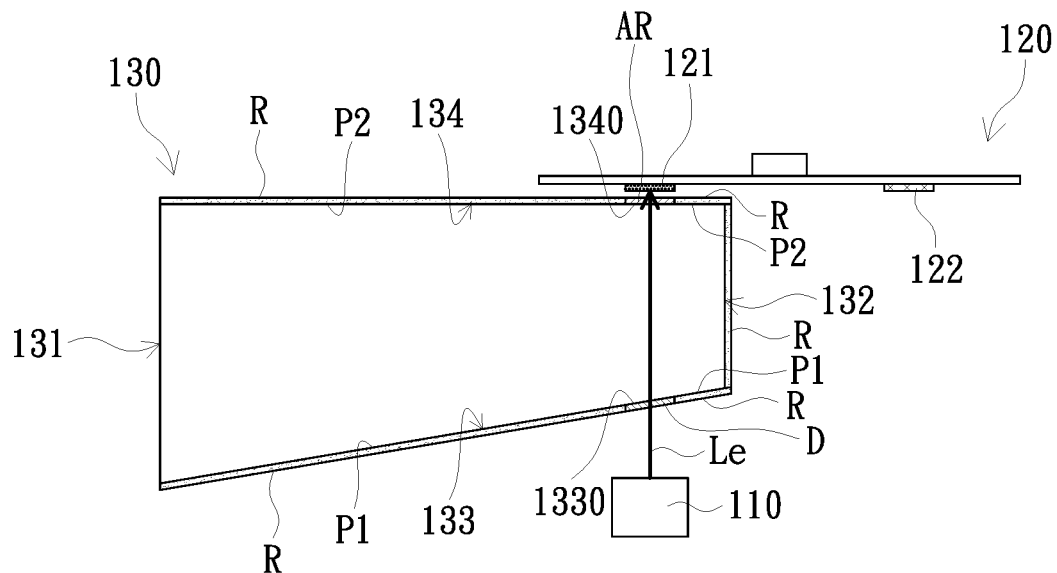
FIG. 1 is a schematic diagram of an illuminating system according to an embodiment of the invention.
Figure 2:
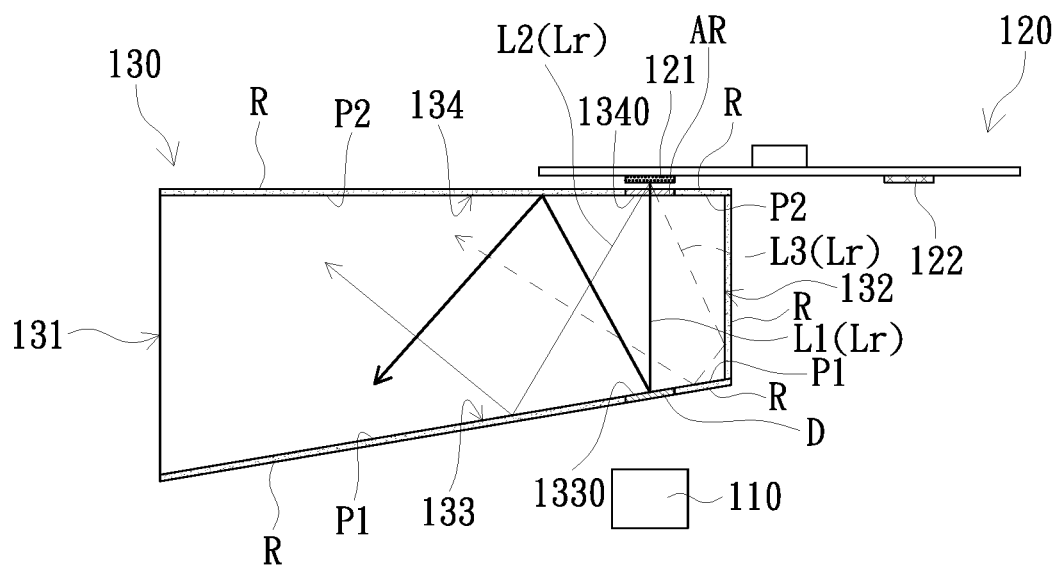
FIG. 2 is a schematic diagram of a transmission of a converted beam in a light guide column in FIG. 1.

FIG. 1 is a schematic diagram of an illuminating system according to an embodiment of the invention. FIG. 2 is a schematic diagram of a transmission of a converted beam in a light guide column in FIG. 1. Please refer to FIGS. 1 and 2. The illuminating system 100 includes a light source 110, a wavelength conversion element 120 and a light guide column 130. The light source 110 is used to provide an excitation beam Le. The wavelength conversion element 120 has a wavelength conversion portion 121. The wavelength conversion portion 121 is used to convert the excitation beam Le into a converted beam Lr. The light guide column 130 is disposed between the light source 110 and the wavelength conversion element 120 and is located on the transmission path of the excitation beam Le. The light guide column 130 has a first end 131, a second end 132 opposite to the first end 131, a third end 133, and a fourth end 134 opposite to the third end 133. The third end 133 faces the light source 110, and the fourth end 134 faces the wavelength conversion element 120. The third end 133 is used to receive the excitation beam Le. The excitation beam Le exits the first end 131 or the fourth end 134. The converted beam Lr enters the light guide column 130 through the fourth end 134 and then exits the first end 131.

The light source 110 is, for example, disposed opposite to the third end 133 of the light guide column 130 and adjacent to the second end 132 of the light guide column 130. The light source 110 includes, for example, a light emitting diode (LED) or a laser diode (LD). The number of light emitting diodes or laser diodes may be one or more. For example, the light emitting diodes (or laser diodes) can be arranged in a matrix when the number of light emitting diodes (or laser diodes) is plural. In this embodiment, the light source 110 emits, for example, a blue excitation beam Le, but the invention is not limited thereto.

Figure 3:
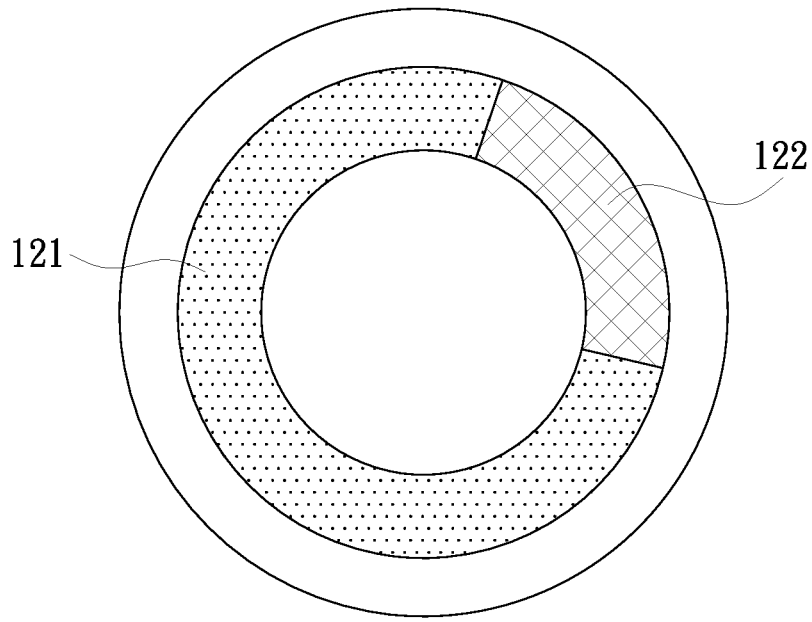
FIG. 3 is a schematic diagram of the wavelength conversion element in FIG. 1.

The wavelength conversion element 120 is, for example, opposite to the fourth end 134 of the light guide column 130 and adjacent to the second end 132 of the light guide column 130. FIG. 3 further describes the wavelength conversion element 120. Please refer to FIG. 3. The wavelength conversion element 120 may further have a reflection portion 122 in addition to the wavelength conversion portion 121. The reflection portion 122 is used to reflect a part of the excitation beam Le into the light guide column 130. Specifically, the wavelength conversion element 120 of this embodiment is, for example, a rotatable wavelength conversion wheel. The reflection portion 122 can be connected to the wavelength conversion portion 121 and arranged in a ring with the wavelength conversion portion 121. The excitation beam Le irradiates the wavelength conversion portion 121 and the reflection portion 122 in turn when the wavelength conversion element 120 rotates. In this embodiment, the wavelength conversion portion 121 may include a wavelength conversion material. After receiving the excitation beam Le, the wavelength conversion material can emit the converted beam Lr (shown in FIG. 2) having a wavelength different from that of the excitation beam Le. For example, the excitation beam Le may be a blue beam, and the converted beam Lr may be a yellow beam. Specifically, the wavelength conversion material may include phosphorescent materials such as fluorescent materials or phosphors; or, the wavelength conversion material may include nanomaterials, such as quantum dots (QD). In another embodiment, the wavelength conversion portion 121 can be divided into a plurality of wavelength conversion blocks (not shown), and each of the wavelength conversion blocks can be provided with wavelength conversion materials with different emission wavelengths to emit the converted beam Lr with different wavelengths. For example, the excitation beam Le can be a blue beam, and the wavelength conversion blocks can emit a green beam and a red beam after receiving the blue beam.

Please refer to FIG. 1 again. In this embodiment, the excitation beam Le provided by the light source 110 enters the light guide column 130 through the third end 133 of the light guide column 130, and then exits the light guide column 130 through the fourth end 134, and then is transmitted to the wavelength conversion element 120. The wavelength conversion portion 121 converts the excitation beam Le into the converted beam Lr when the excitation beam Le irradiates the wavelength conversion portion 121, and the converted beam Lr is reflected back into the light guide column 130 through the fourth end 134, as shown in FIG. 2. After entering the light guide column 130, the converted beam Lr can be reflected between the second end 132, the third end 133 and the fourth end 134, and exit the light guide column 130 through the first end 131. As mentioned above, because the excitation beam Le passes through the third end 133, the third end 133 may have a first light transmitting portion 1330 for allowing the excitation beam Le to pass therethrough. On the other hand, as shown in FIGS. 1 and 2, because both the excitation beam Le and the converted beam Lr pass through the fourth end 134, the fourth end 134 may have a second light transmitting portion 1340 for allowing the excitation beam Le and the converted beam Lr to pass therethrough. In this embodiment, the first light transmitting portion 1330 and the second light transmitting portion 1340 are, for example, adjacent to the second end 132. Specifically, because the position of the first light transmitting portion 1330 can match the position of the light source 110, the first light transmitting portion 1330 can be adjacent to the second end 132 for allowing the excitation beam Le emitted from the light source 110 to pass therethrough. Similarly, because the position of the second light transmitting portion 1340 can match the position of the wavelength conversion element 120, the second light transmitting portion 1340 can be adjacent to the second end 132, so that the excitation beam Le can be incident on the wavelength conversion portion 121 through the second light transmitting portion 1340, and the converted beam Lr emitted from the wavelength conversion portion 121 can enter the light guide column 130 through the second light transmitting portion 1340. The detailed features of the second light transmitting portion 1340 will be described first, and the detailed features of the first light transmitting portion 1330 will be described in the subsequent paragraphs. The second light transmitting portion 1340 may be provided with an anti-reflection coating AR to increase the amount of light of the excitation beam Le emitted from the second light transmitting portion 1340 and the amount of light of the converted beam Lr entering the light guide column 130 through the second light transmitting portion 1340. In another embodiment, the anti-reflection coating AR disposed on the second light transmitting portion 1340 can also cover the entire fourth end 134. In this embodiment, it should be noted that the distribution range of the second light transmitting portion 1340 can be configured according to the distance between the wavelength conversion portion 121 and the second light transmitting portion 1340, and this embodiment does not limit the distribution range of the second light transmitting portion 1340.

Follow the above description. After entering the light guide column 130, a part of the light with a smaller angle (e.g., light L1) in the converted beam Lr is incident on the first light transmitting portion 1330 of the third end 133 first, and is then incident on the part other than the second light transmitting portion 1340 (e.g., partial area P2) of the fourth end 134 after being reflected by the first light transmitting portion 1330. Furthermore, in order to prevent the light L1 from leaking from the first light transmitting portion 1330 and allow the excitation beam Le (shown in FIG. 1) to pass through the first light transmitting portion 1330, the first light transmitting portion 1330 may be provided with a dichroic coating D. The dichroic coating D is used to reflect the converted beam Lr and allow the excitation beam Le to pass therethrough. In this way, a part of the converted beam Lr (e.g., light L1) can be prevented from leaking from the first light transmitting portion 1330, and the brightness of the excitation beam Le after passing through the first light transmitting portion 1330 is not affected, thereby improving the light utilization efficiency. In another embodiment, the dichroic coating D may be replaced by an anti-reflection coating to increase the amount of light of the excitation beam Le entering the light guide column 130 through the first light transmitting portion 1330. It should be noted that the distribution range of the first light transmitting portion 1330 in this embodiment can be configured based on the range where the excitation beam Le irradiates the third end 133, and this embodiment does not limit the distribution range of the first light transmitting portion 1330. In this embodiment, the partial area P2 of the fourth end 134 may be provided with a reflection coating R; or, the reflection coating R may be replaced by a dichroic coating used to reflect the converted beam Lr. In this way, a part of the converted beam Lr (e.g., light L1) can be prevented from leaking from the partial area P2, thereby improving the light utilization efficiency.

In addition, after entering the light guide column 130, a part of the light with a larger exit angle (e.g., light L2) in the converted beam Lr is then incident on the part other than the first light transmitting portion 1330 (e.g., partial area P1) of the third end 133. Therefore, the partial area P1 of the third end 133 may be provided with a reflection coating R; or, the reflection coating R may be replaced by a dichroic coating used to reflect the converted beam Lr and allow the excitation beam Le to pass therethrough. In this way, a part of the converted beam Lr can be prevented from leaking from the partial area P1 of the third end 133, thereby improving the light utilization efficiency.

In another aspect, another part of the light with a larger exit angle (e.g., light L3) in the converted beam Lr is incident on the second end 132 after entering the light guide column 130. Therefore, the second end 132 may be provided with a reflection coating R to prevent the converted beam Lr from leaking from the second end 132, thereby improving the light utilization efficiency.

In this embodiment, the area of the first end 131 may be greater than the area of the second end 132. Specifically, the first end 131 may be substantially parallel to the second end 132. The fourth end 134 may be substantially perpendicular to the first end 131 and the second end 132. The third end 133 is inclined relative to the first end 131 and the second end 132. Furthermore, a part of the light (e.g., light L1, L2, and L3) in the converted beam Lr is incident on the third end 133 after entering the light guide column 130. Therefore, the third end 133 may be gradually closer to the fourth end 134 along the direction from the first end 131 to the second end 132. In this way, the converted beam Lr reflected by the third end 133 can be incident on the fourth end 134 at a larger angle, so as to reduce the amount of light of the converted beam Lr emitted from the fourth end 134, thereby improving the light utilization efficiency. It should be noted that because the converted beam Lr exits from the first end 131, the illuminating system 100 may further include a filter wheel (not shown) disposed adjacent to the first end 131 to convert the color of the converted beam Lr into a desired color.

Figure 4:
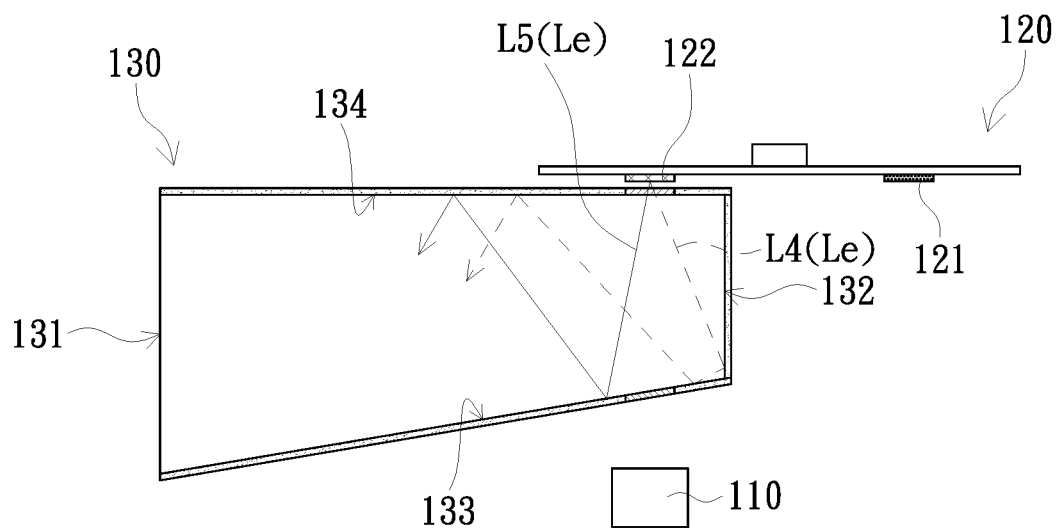
FIG. 4 is a schematic diagram of a transmission of the excitation beam in the light guide column in FIG. 1.

FIG. 4 is a schematic diagram of a transmission of the excitation beam in the light guide column in FIG. 1. As described above, a part of the excitation beam Le irradiates the reflection portion 122 and is reflected back to the light guide column 130 by the reflection portion 122. Please refer to FIG. 4. After being reflected back to the light guide column 130 by the reflection portion 122, the excitation beam Le is, for example, reflected between the second end 132, the third end 133 and the fourth end 134, and then exits the light guide column 130 through the first end 131. In detail, after entering the light guide column 130, a part of the light (e.g., light L4) in the excitation beam Le first, for example, is incident on the second end 132, and then may be sequentially incident on the third end 133 and the fourth end 134. After having at least one total reflection between the third end 133 and the fourth end 134, the light L4 exits the light guide column 130 through the first end 131. On the other hand, after entering the light guide column 130, a part of the light (e.g., light L5) in the excitation beam Le may be first incident on the third end 133 and then exits from the first end 131 after having at least once total reflection between the third end 133 and the fourth end 134.

Figure 5:
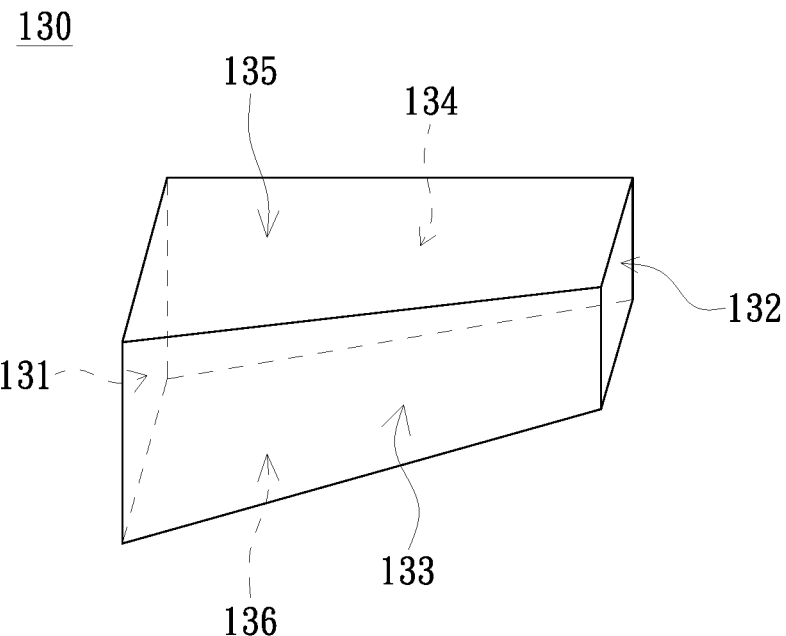
FIG. 5 is a schematic perspective view of the light guide column in FIG. 1.

FIG. 5 is a schematic perspective view of the light guide column in FIG. 1. Please refer to FIG. 5. In addition to the first end 131, the second end 132, the third end 133 and the fourth end 134, the light guide column 130 may further have a first surface 135 and a second surface 136 opposite to each other. The first surface 135 and the second surface 136 are located between the first end 131 and the second end 132 and connected between the third end 133 and the fourth end 134. In detail, because the converted beam Lr (shown in FIG. 2) may be incident on the first surface 135 and the second surface 136 after entering the light guide column 130, the first surface 135 and the second surface 136 may each be provided with a reflection coating (not shown) or a dichroic coating (not shown) for reflecting the converted beam Lr, so as to prevent the converted beam Lr from leaking from the first surface 135 and the second surface 136. It should be noted that the light guide column 130 of this embodiment can be a solid column, and the above-mentioned dichroic coating, reflection coating and anti-reflection coating are, for example, thin coatings disposed on the surface of the solid column.

Compared with the prior art, in the illuminating system 100 of this embodiment, the light guide column 130 is disposed between the light source 110 and the wavelength conversion element 120, the third end 133 of the light guide column 130 faces the light source 110, and the fourth end 134 opposite to the third end 133 faces the wavelength conversion element 120. The excitation beam Le provided by the light source 110 can be incident on the wavelength conversion element 120 after passing through the third end 133 and the fourth end 134. A part of the excitation beam Le is converted into the converted beam Lr by the wavelength conversion element 120, and the converted beam Lr can be incident on the light guide column 130 and exits the light guide column 130 through the first end 131. In another aspect, another part of the excitation beam Le not converted by the wavelength conversion element 120 may be incident on the light guide column 130 again and exits the light guide column 130 through the first end 131. In other words, the light guide column 130 of this embodiment also has a dichroic function, in addition to the light guide function. In addition, the second end 132, the third end 133, the fourth end 134, the first surface 135 and the second surface 136 of the light guide column 130 may further be provided with the dichroic coating D, the reflection coating R and/or the anti-reflection coating AR to prevent the converted beam Lr and the excitation beam Le from leaking from the light guide column 130, thereby improving the light utilization efficiency. Based on the above description, the illuminating system 100 of this embodiment can omit the dichroic element mentioned in the "BACKGROUND OF THE INVENTION", thereby simplifying the overall structure and achieving the advantages of easy assembly, good optical path accuracy and small size.

Figure 6:
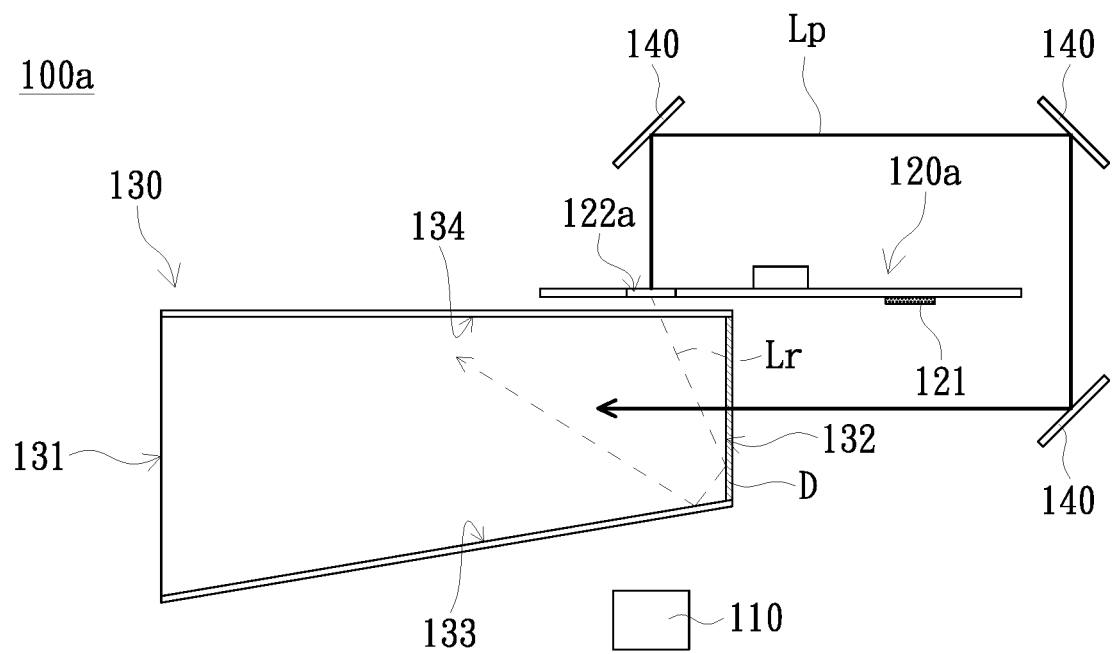
FIG. 6 is a schematic diagram of an illuminating system according to another embodiment of the invention.
Figure 7:
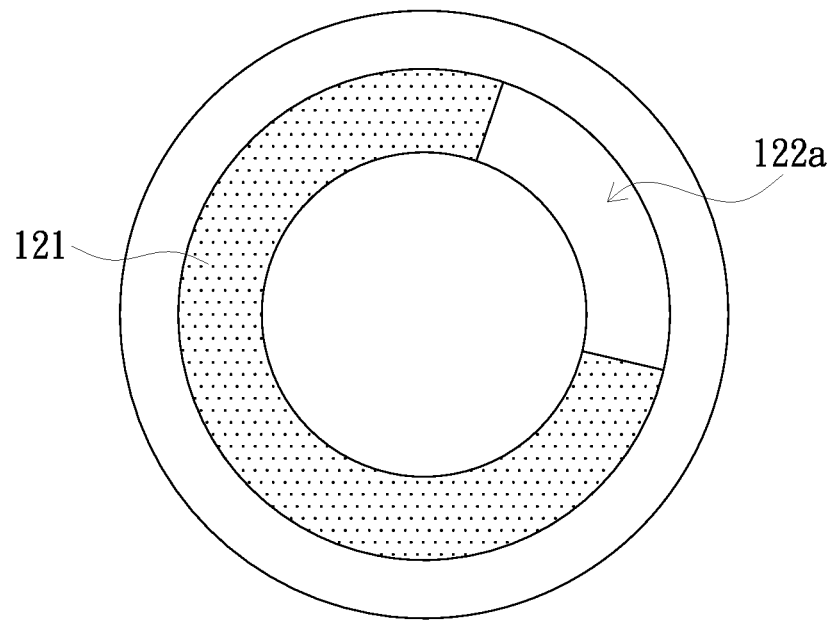
FIG. 7 is a schematic diagram of a wavelength conversion element in FIG. 6.

FIG. 6 is a schematic diagram of an illuminating system according to another embodiment of the invention. FIG. 7 is a schematic diagram of a wavelength conversion element in FIG. 6. The structure and advantages of the illuminating system 100a of this embodiment are similar to those of the embodiment of FIG. 1, and only the differences are described below. Please refer to FIGS. 6 and 7. The wavelength conversion element 120a may further include a penetration portion 122a, in addition to the wavelength conversion portion 121, wherein the reflection portion 122 shown in FIG. 3 is not provided in the wavelength conversion element 120a. The penetration portion 122a is used to allow a part of the excitation beam Le to pass therethrough to form a penetration beam Lp. In addition to the above features, the illuminating system 100a may further include a guiding assembly 140 disposed on the transmission path of the penetration beam Lp to guide the penetration beam Lp to pass through the second end 132 and the first end 131 sequentially. In this embodiment, the penetration portion 122a may be configured as an opening for allowing the excitation beam Le to pass therethrough. In another aspect, the guiding assembly 140 includes, for example, three mirrors, but is not limited thereto. The second end 132 of the light guide column 130 may be provided with a dichroic coating D. The dichroic coating D is used to reflect the converted beam Lr (shown in FIG. 2) and allow the excitation beam Le (shown in FIG. 1) to pass therethrough. Specifically, the penetration beam Lp with the same wavelength as the excitation beam Le needs to pass through the second end 132, and a part of the converted beam Lr is incident on the second end 132 from the inside of the light guide column 130. Therefore, by disposing the dichroic coating D at the second end 132, not only the penetration beam Lp can pass through the second end 132, but also the converted beam Lr can be prevented from leaking from the second end 132, thereby improving the light utilization efficiency.

Figure 8:
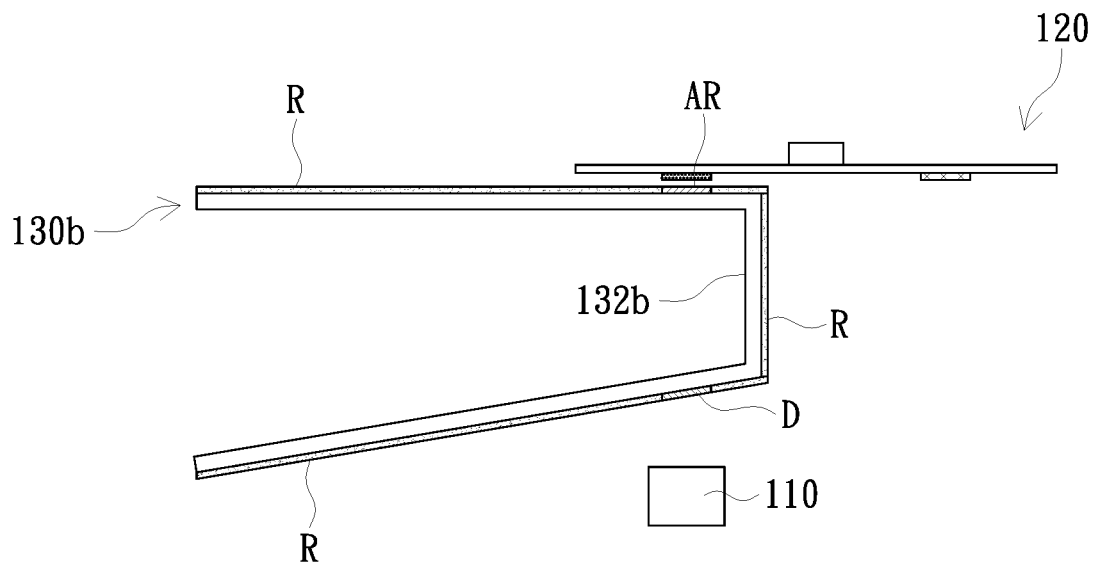
FIG. 8 is a schematic diagram of an illuminating system according to another embodiment of the invention.

FIG. 8 is a schematic diagram of an illuminating system according to another embodiment of the invention. The structure and advantages of the illuminating system 100b of this embodiment are similar to those of the embodiment of FIG. 1, and the main difference is that the light guide column 130b of this embodiment can be a hollow column. The above-mentioned anti-reflection coating AR, dichroic coating D and reflection coating R can be disposed on the outer surface or inner surface of the light guide column 130b. For example, in FIG. 8, the anti-reflection coating AR, the dichroic coating D and the reflection coating R are disposed on the outer surface of the light guide column 130b, but this embodiment does not limit the specific positions of the anti-reflection coating AR, the dichroic coating D and the reflection coating R. In addition, the anti-reflection coating AR, the dichroic coating D and the reflection coating R can also be provided at the second end 132b of the light guide column 130b.

Figure 9:
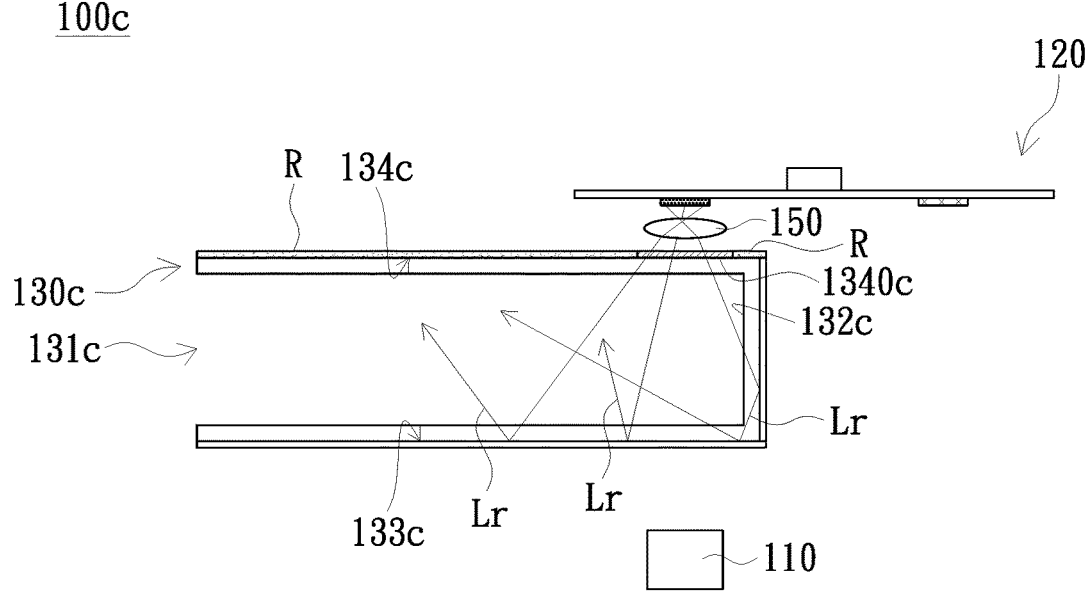
FIG. 9 is a schematic diagram of an illuminating system according to another embodiment of the invention.

FIG. 9 is a schematic diagram of an illuminating system according to another embodiment of the invention. The structure and advantages of the illuminating system 100c of this embodiment are similar to those of the previous embodiments, and only the differences are described below. Please refer to FIG. 9. The area of the first end 131c of the light guide column 130c may be equal to the area of the second end 132c. It should be noted that the light guide column 130c in FIG. 9 is shown as a hollow column, but the light guide column 130c may be a solid column in another embodiment. This embodiment does not limit the specific structure of the light guide column 130c. In this embodiment, the third end 133c can be substantially parallel to the fourth end 134c, so that the opening area of the first end 131c can be substantially equal to the area of the second end 132c. Similar to the embodiment of FIG. 1, the fourth end 134c of this embodiment can also be provided with a reflection coating R; or, the reflection coating R may be replaced by a dichroic coating used to reflect the converted beam Lr. In this way, the converted beam Lr can be prevented from leaking from the fourth end 134c, thereby improving the light utilization efficiency. In this embodiment, the illuminating system 100c may further include a condenser lens 150 disposed between the second light transmitting portion 1340c and the wavelength conversion element 120. The condenser lens 150 enables the converted beam Lr to exit in a more concentrated light pattern, thereby increasing the amount of light of the converted beam Lr entering the light guide column 130c from the second light transmitting portion 1340c. The condenser lens 150 is, for example, a convex lens, but is not limited thereto.

Figure 10:
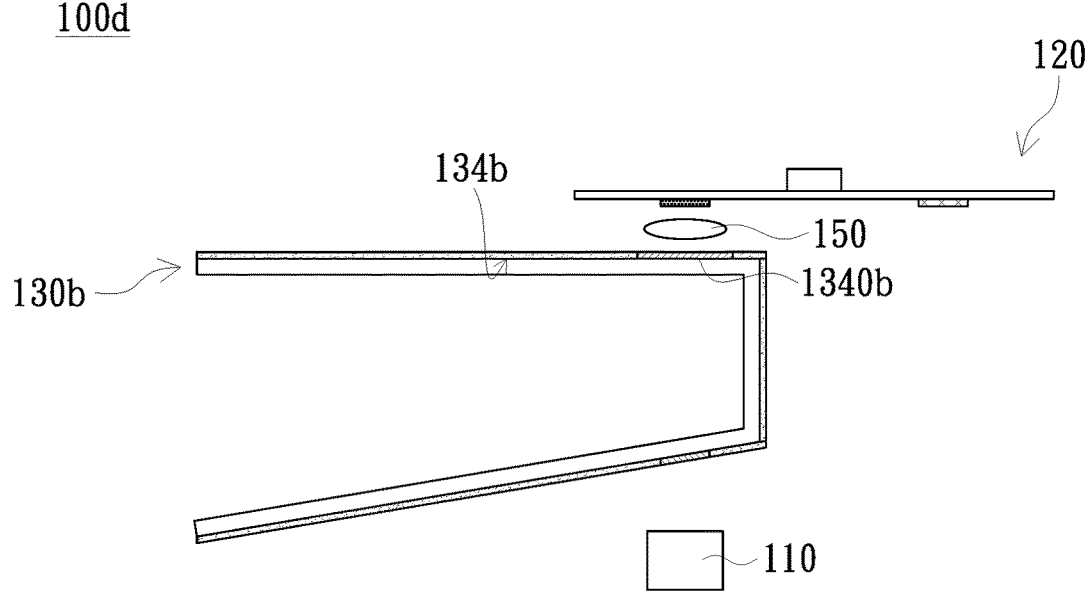
FIG. 10 is a schematic diagram of an illuminating system according to another embodiment of the invention.

It should be noted that although the condenser lens 150 shown in FIG. 9 is matched with the light guide column 130c, the condenser lens 150 can also be matched with the light guide column 130, 130a or 130b in other embodiments. For example, referring to the illumination system 100d in FIG. 10, the condenser lens 150 is matched with the light guide column 130b, and is disposed between the second light transmitting portion 1340b of the fourth end 134b and the wavelength conversion element 120.

Figure 11:
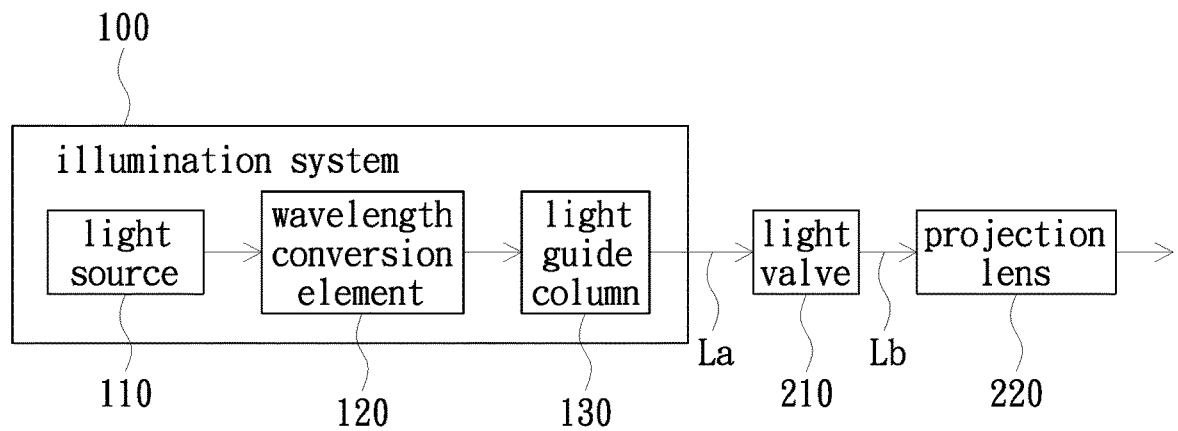
FIG. 11 is a schematic diagram of a projection device according to an embodiment of the invention.

FIG. 11 is a schematic diagram of a projection device according to an embodiment of the invention. Please refer to FIG. 11. The projection device 200 includes the above-mentioned illuminating system 100, a light valve 210 and a projection lens 220. The illumination system 100 is used to provide an illumination beam La. The light valve 210 is disposed on the transmission path of the illumination beam La to convert the illumination beam La into an image beam Lb. The projection lens 220 is disposed on the transmission path of the image beam Lb.

As mentioned above, the illuminating system 100 may include a light source 110, a wavelength conversion element 120 and a light guide column 130. The illumination beam La is, for example, a beam emitted from the first end 131 of the light guide column 130. In detail, because the wavelength conversion element 120 of this embodiment has the wavelength conversion portion 121 and the reflection portion 122 (both shown in FIG. 3), the illumination beam La may include the excitation beam Le (shown in FIG. 1) and the converted beam Lr (shown in FIG. 2). Thus, it is further explained that the illumination beam La represents the beam when the excitation beam Le (shown in FIG. 1) and the converted beam Lr (shown in FIG. 2) are transmitted sequentially. In another embodiment, the wavelength conversion element may replace the reflection portion 122 with the penetration portion 122a (shown in FIG. 7), and the illumination beam La may include the penetration beam Lp (shown in FIG. 6) and the converted beam Lr (shown in FIG. 2). Because other features of the illuminating system 100 have been described in detail above, no redundant detail is to be given herein.

The light valve 210 is, for example, a digital micromirror device (DMD), a liquid crystal on silicon (LCoS) or a liquid crystal display (LCD), but is not limited thereto. In addition, this embodiment does not limit the number of light valves 210. For example, the projection device 200 of this embodiment can adopt a single-chip liquid crystal display panel or three-chip liquid crystal display panel structure, but is not limited thereto.

The projection lens 220 includes, for example, one or more optical lenses, and the refractive powers of the optical lenses may be the same or different from each other. For example, the optical lens may include various non-planar lenses such as biconcave lenses, biconvex lenses, meniscus lenses, convex-concave lenses, plano-convex lenses, and plano-concave lenses, or any combination of the above-mentioned non-planar lenses. On the other hand, the projection lens 220 may also include a planar optical lens. This embodiment does not limit the type and configuration of the projection lens 220.

Because the projection device 200 of this embodiment is equipped with an illumination system 100 having the advantages of easy assembly, good optical path accuracy and small size, the projection device 200 can have the advantages of small size and good image quality, compared with the prior art.

In summary, in the illuminating system of the embodiment of the invention, the light guide column is disposed between the light source and the wavelength conversion element, the third end of the light guide column faces the light source, and the fourth end opposite to the third end faces the wavelength conversion element. The excitation beam provided by the light source can be incident on the wavelength conversion element after passing through the third end and the fourth end. A part of the excitation beam is converted into the converted beam by the wavelength conversion element, and the converted beam can be incident on the light guide column and exits the light guide column through the first end. In another aspect, another part of the excitation beam not converted by the wavelength conversion element may be incident on the light guide column again and exits the light guide column through the first end. In other words, the light guide column of the illuminating system in the embodiment of the invention also has dichroic and light homogenization functions, in addition to the light guide function. Therefore, some internal components can be omitted, thereby simplifying the overall structure and achieving the advantages of easy assembly, good optical path accuracy and small size. In addition, because the projection device of the embodiment of the invention is equipped with the above-mentioned illumination system, the projection device has the advantages of small size and good image quality.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive.

Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first end, the second end, the third end, the fourth end, the first light transmitting portion, the second light transmitting portion, the first surface and the second surface are only used for distinguishing various elements and do not limit the number of the elements.

What is claimed is:

1. An illumination system, comprising a light source, a wavelength conversion element and a light guide column, wherein:
    the light source is used to provide an excitation beam;
    the wavelength conversion element has a wavelength conversion portion used to convert the excitation beam into a converted beam; and
    the light guide column is disposed between the light source and the wavelength conversion element and is located on a transmission path of the excitation beam, the light guide column has a first end, a second end opposite to the first end, a third end, and a fourth end opposite to the third end, the third end faces the light source, the fourth end faces the wavelength conversion element, the third end is used to receive the excitation beam, the excitation beam exits from the first end or the fourth end, and the converted beam enters the light guide column through the fourth end and exits from the first end.

2. The illumination system according to claim 1, wherein the third end has a first light transmitting portion for allowing the excitation beam to pass therethrough, the fourth end has a second light transmitting portion for allowing the excitation beam to pass therethrough, and the converted beam enters the light guide column through the second light transmitting portion and exits from the first end after being reflected in the light guide column.

3. The illumination system according to claim 2, wherein the wavelength conversion element further has a penetration portion for allowing a part of the excitation beam to pass therethrough to form a penetration beam, and the illumination system further comprises a guiding assembly disposed on a transmission path of the penetration beam to guide the penetration beam to sequentially pass through the second end and the first end.

4. The illumination system according to claim 3, wherein the second end is provided with a dichroic coating used to reflect the converted beam and allow the excitation beam to pass therethrough.

5. The illumination system according to claim 2, wherein the first light transmitting portion and the second light transmitting portion are adjacent to the second end.

6. The illumination system according to claim 2, wherein the first light transmitting portion of the third end is provided with a dichroic coating or an anti-reflection coating, and the dichroic coating is used to reflect the converted beam and allow the excitation beam to pass therethrough.

7. The illumination system according to claim 2, wherein a part other than the first light transmitting portion of the third end is provided with a dichroic coating or a reflection coating, and the dichroic coating is used to reflect the converted beam and allow the excitation beam to pass therethrough.

8. The illumination system according to claim 2, wherein the second light transmitting portion of the fourth end is provided with an anti-reflection coating.

9. The illumination system according to claim 2, wherein a part other than the second light transmitting portion of the fourth end is provided with an anti-reflection coating, a dichroic coating or a reflection coating, and the dichroic coating is used to reflect the converted beam.

10. The illumination system according to claim 2, further comprising a condenser lens disposed between the second light transmitting portion and the wavelength conversion element.

11. The illumination system according to claim 1, wherein the wavelength conversion element further has a reflection portion used to reflect a part of the excitation beam into the light guide column.

12. The illumination system according to claim 11, wherein the second end is provided with a reflection coating.

13. The illumination system according to claim 1, wherein the light guide column further has a first surface and a second surface opposite to each other, the first surface and the second surface are located between the first end and the second end and connected between the third end and the fourth end, the first surface and the second surface are each provided with a reflection coating or a dichroic coating, and the dichroic coating is used to reflect the converted beam.

14. The illumination system according to claim 1, wherein an area of the first end is greater than or equal to an area of the second end.

15. The illumination system according to claim 1, wherein the first end is parallel to the second end, the fourth end is perpendicular to the first end and the second end, and the third end is inclined relative to the first end and the second end.

16. The illumination system according to claim 1, wherein the light guide column is a solid column or a hollow column.

17. The illumination system according to claim 1, wherein the wavelength conversion element is a wavelength conversion wheel.

18. A projection device, comprising an illumination system, a light valve and a projection lens, wherein the illumination system is used to provide an illumination beam, the light valve is disposed on a transmission path of the illumination beam to convert the illumination beam into an image beam, the projection lens is disposed on a transmission path of the image beam, and the illumination system comprises a light source, a wavelength conversion element and a light guide column, wherein:

the light source is used to provide an excitation beam;

the wavelength conversion element has a wavelength conversion portion used to convert the excitation beam into a converted beam; and the light guide column is disposed between the light source and the wavelength conversion element and is located on a transmission path of the excitation beam, the light guide column has a first end, a second end opposite to the first end, a third end, and a fourth end opposite to the third end, the third end faces the light source, the fourth end faces the wavelength conversion element, the excitation beam is incident on the second end and the third end and then exits from the first end, the third end is used to receive the excitation beam, and the excitation beam exits from the first end or the fourth end.

* * * * *